D. S. PEMBROKE.

Assignor to W. S. LAWRENCE.

TWO WHEELED VEHICLE.

No. 10,962. Reissued Oct. 9, 1888.

Witnesses.

John C. Perkins.

John H. Chase.

Inventor.

Daniel S. Pembroke

By Lucius C. West.

Atty.

N. PETERS, Photo-Lithographer, Washington, D. C.

UNITED STATES PATENT OFFICE.

DANIEL S. PEMBROKE, OF KALAMAZOO, MICHIGAN, ASSIGNOR TO WILLIAM S. LAWRENCE, OF SAME PLACE.

TWO-WHEELED VEHICLE.

SPECIFICATION forming part of Reissued Letters Patent No. 10,962, dated October 9, 1888.

Original No. 375,506, dated December 27, 1887. Application for reissue filed April 14, 1888. Serial No. 270,688.

*To all whom it may concern:*

Be it known that I, DANIEL S. PEMBROKE, a citizen of the United States, residing at Kalamazoo, county of Kalamazoo, State of Michigan, have invented a new and useful Two-Wheeled Vehicle, of which the following is a specification.

This invention has for its objects certain improvements below described and claimed.

Figure 1:
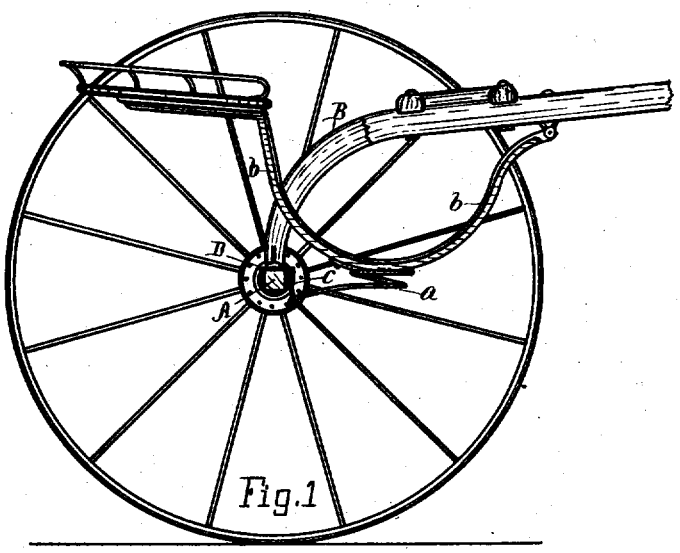
Figure 2:
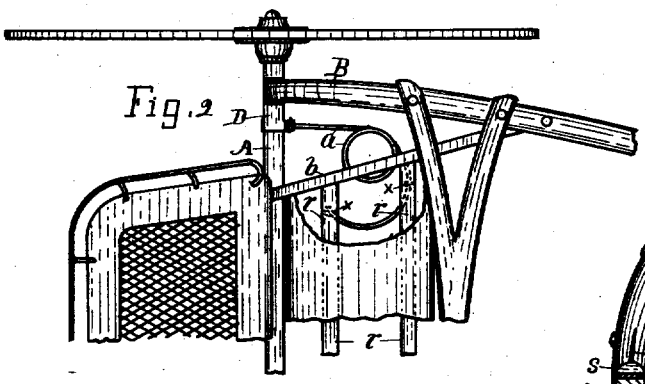
Figure 4:
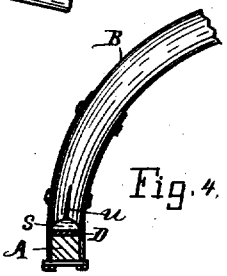
Figure 3:
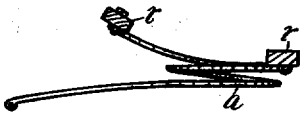
Figure 5:
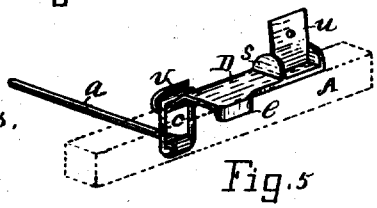

In the drawings forming a part of this specification, Figure 1 is a side elevation with one wheel removed; Fig. 2, a plan of about one-half of the vehicle; Fig. 3, enlarged lettered details in Fig. 1; Fig. 4, lettered details in Fig. 1, enlarged; and Fig. 5 is an enlarged perspective view of parts below described.

Referring to the lettered parts of the drawings, B are the thills; *b*, the seat-bars or body, and A the axle, as heretofore.

At D is a peculiarly-constructed bracket, having the upwardly-extended flanges S, with a central partition, *u*. In use the bracket rests on the axle A and the end of the thill rests between the flanges S, while the partition *u* is passed into a slit in the thill B, Fig. 4. The thill is secured to the axle and this part of the bracket by the clip and clip-irons, as heretofore. The bracket is further provided with a downward flange, *e*, at the other end, which catches over the back side of the axle A, and a hook or eye, *v*, into which the link *c* is hung, Fig. 5.

The spring *a* is a vertically-located spiral. The upper end is extended away from the spiral, and is rigidly attached at *x x* to the foot-slats *r r*, Fig. 2, and the lower end of the spring extends to the axle and is pivotally attached to the lower end of the link *c*. The spiral part of the spring is thus located beneath and partially under the body.

A leverage action is had on the spring when the body is borne down, which rocks the spiral and separates the circles at the forward side, while at the same time the spring yields downward by the compression of the spiral and the yielding of the portion of the spring which extends from the spiral to the axle.

The bracket, while it assists in holding the thill, is in turn held and braced from canting by the thill and flange *e*, so that it sustains the link *c*, upon which a great strain is brought to bear by the peculiar action of the spring. But little, if any, horse-motion is experienced by the use of this spring, because the jar is not so readily transmitted to the seat as in spiral springs horizontally located and having a different action. Instead of coupling the lower extended end of the spring with the axle it may be coupled with the thill or other ways, as desired. Of course both sides of the vehicle are like the side here shown. These springs may be employed to sustain the ends of the body of a four-wheeled vehicle in a like relation here shown.

Having thus described my invention, what I claim is—

1. The combination of the fulcrumed body or seat-bars, axle, and the vertical spirals having the two extended ends, the upper end being rigidly attached to the body and the lower end coupled to the axle or other suitable support, substantially as set forth.

2. The combination of the thills, the brackets having the upward flanges and central partition, the downward flange and forward hook, the axle, the links, and the springs comprising the vertical spirals, and the extended ends, one end being rigidly attached to the body and the other end coupled to the links sustained by the brackets, substantially as set forth.

3. The combination of the body, the thills having their ends slitted, the axle, the brackets having the upwardly-extended plates in the slits of the thills and between the upward flanges, and the springs sustaining the body, substantially as set forth.

DANIEL S. PEMBROKE.

Witnesses:
RILEY P. HOBBS,
C. H. LAWRENCE.